United States Patent
Higashi (10) Patent No.: US 9,154,049 B2
(45) Date of Patent: Oct. 6, 2015

(54) POWER CONVERSION APPARATUS HAVING A THREE-LEVEL CONVERTER THAT CONVERTS AC VOLTAGE TO DC VOLTAGE HAVING THREE LEVELS

(75) Inventor: Kotaro Higashi, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 14/400,252

(22) PCT Filed: May 10, 2012

(86) PCT No.: PCT/JP2012/061995
§ 371 (c)(1),
(2), (4) Date: Nov. 25, 2014

(87) PCT Pub. No.: WO2013/168257
PCT Pub. Date: Nov. 14, 2013

(65) Prior Publication Data
US 2015/0124504 A1    May 7, 2015

(51) Int. Cl.
*H02M 7/46* (2006.01)
*H02M 7/487* (2007.01)
*H02M 7/515* (2007.01)

(52) U.S. Cl.
CPC ............... *H02M 7/46* (2013.01); *H02M 7/487* (2013.01); *H02M 7/5152* (2013.01)

(58) Field of Classification Search
CPC ...... H02M 7/46; H02M 7/487; H02M 7/5152
See application file for complete search history.

(56) References Cited

U.S. PATENT DOCUMENTS

| 4,855,893 | A  | * | 8/1989  | Kratz ............................ 363/136 |
| 6,058,031 | A  | * | 5/2000  | Lyons et al. .................... 363/67 |
| 6,349,044 | B1 | * | 2/2002  | Canales-Abarca et al. ..... 363/17 |
| 6,392,907 | B1 | * | 5/2002  | Ichikawa ........................ 363/98 |
| 8,471,584 | B2 | * | 6/2013  | Soldi et al. ................ 324/762.01 |
| 8,908,405 | B2 | * | 12/2014 | Yang ............................. 363/132 |
| 2005/0190583 | A1 | * | 9/2005 | Morimoto et al. .............. 363/24 |
| 2007/0159749 | A1 | * | 7/2007 | Oka ............................. 361/93.1 |
| 2011/0216561 | A1 | * | 9/2011 | Bayerer et al. .................. 363/71 |

(Continued)

FOREIGN PATENT DOCUMENTS

| JP | 6 46569   | 2/1994  |
| JP | 10 304673 | 11/1998 |

(Continued)

OTHER PUBLICATIONS

International Search Report Issued Aug. 7, 2012 in PCT/JP12/061995 Filed May 10, 2012.

*Primary Examiner* — Emily P Pham
(74) *Attorney, Agent, or Firm* — Oblon, McClelland, Maier & Neustadt, L.L.P.

(57) ABSTRACT

When switching control signals of self-excited semiconductor devices from OFF-control to ON-control, a control circuit controls the self-excited semiconductor device to be ON after a lapse of a turn-ON time from when a control voltage is applied to the self-excited semiconductor device. When switching the control signals of the self-excited semiconductor devices from ON-control to OFF-control, the control circuit controls the control signal of the self-excited semiconductor device to be OFF after a lapse of a turn-OFF time from when the control voltage is applied to the self-excited semiconductor device.

3 Claims, 7 Drawing Sheets

(56) References Cited

U.S. PATENT DOCUMENTS

2011/0267862 A1* 11/2011 Roesner et al. ............... 363/132
2012/0257430 A1* 10/2012 Truettner ...................... 363/131
2013/0148391 A1*  6/2013 Grbovic et al. ............ 363/56.01

FOREIGN PATENT DOCUMENTS

| JP | 2008 178188 | 7/2008 |
| WO | 2012 046521 | 4/2012 |

* cited by examiner

POWER CONVERSION APPARATUS HAVING A THREE-LEVEL CONVERTER THAT CONVERTS AC VOLTAGE TO DC VOLTAGE HAVING THREE LEVELS

TECHNICAL FIELD

The present invention relates to a power conversion apparatus, and particularly to a power conversion apparatus outputting a low frequency and a low voltage.

BACKGROUND ART

For example, in a power conversion apparatus in which switching semiconductor devices are controlled to be ON/OFF to supply a sinusoidal current for variable-speed driving a load of a variable-speed pumping generator and the like, when the output frequency of the power conversion apparatus (for example, a three-level converter) is a relatively low frequency, the time period during which the sinusoidal current is positively or negatively conducted is prolonged. This lengthens the time period during which the switching semiconductor devices are conducted, and the junction temperature of the switching semiconductor devices continues rising during this time period, with the result that overheating may finally cause breakage.

The following is proposed as a technique for protecting a switching semiconductor device from overheating as described above.

Japanese Patent Laying-Open No. 2008-178188 (PTD 1) aims to provide a power conversion apparatus that, when the output frequency becomes relatively low, operates for an increased duration under a certain load condition required by a system and is also capable of continuously operating even under the load condition different from that required by the system. The invention disclosed in Japanese Patent Laying-Open No. 2008-178188 (PTD 1) provides a power conversion apparatus including a power converter that has a plurality of switching semiconductor devices and controls these switching semiconductor devices to be ON or OFF to supply a sinusoidal current to an alternating-current (AC) electric motor. The power conversion apparatus is configured to include frequency correction means. When the output frequency of the power converter becomes a relatively low frequency that is equal to or less than a prescribed value, the frequency correction means increases the output frequency in proportion to the equivalent of the heat load of the switching devices calculated by operation.

CITATION LIST

Patent Document

PTD 1: Japanese Patent Laying-Open No. 2008-178188

SUMMARY OF INVENTION

Technical Problem

According to the invention disclosed in Japanese Patent Laying-Open No. 2008-178188 (PTD 1), however, the frequency correction means is further provided, which poses a problem that the power conversion apparatus is increased in area and also increased in cost.

Furthermore, as described above, when the three-level converter is operated in a low frequency and at a low modulation rate, semiconductor devices are partially increased in temperature as compared with a two-level converter having two semiconductor devices connected in series. On the other hand, when the conventional two-level converter is used, there occurs a problem that it becomes difficult to adjust the voltage range between two semiconductor devices.

The present invention has been made in light of the above-described problems. An object of the present invention is to provide a power conversion apparatus that outputs a low frequency and a low voltage without having to provide conventional frequency correction means.

Solution to Problem

A three-level converter is included that converts an AC voltage of an AC power supply into a direct-current (DC) voltage having three levels corresponding to first to third potentials. The three-level converter includes: first to third input terminals; and an output terminal outputting the DC voltage. The second input terminal is supplied with an intermediate potential of the first to third potentials. The three-level converter further includes: first and second switching semiconductor devices connected in series in this order between the first input terminal and the output terminal; first and second freewheeling diodes connected in series in this order between the first input terminal and the output terminal and in a direction opposite to a direction in which a current flows through the first and second switching semiconductor devices; a first coupling diode having an anode connected to the second input terminal and a cathode connected to a connection node between the first switching semiconductor device and the second switching semiconductor device, and connected to a connection node between the first freewheeling diode and the second freewheeling diode; third and fourth switching semiconductor devices connected in series in this order between the output terminal and the third input terminal; third and fourth freewheeling diodes connected in series in this order between the output terminal and the third input terminal and in a direction opposite to a direction in which a current flows through the third and fourth switching semiconductor devices; and a second coupling diode having a cathode connected to the second input terminal and an anode connected to a connection node between the third switching semiconductor device and the fourth switching semiconductor device, and connected to a connection node between the third freewheeling diode and the fourth freewheeling diode. A control circuit is further included that controls the first to fourth switching semiconductor devices to be switched ON and OFF. When switching control signals of the first and second switching semiconductor devices from OFF-control to ON-control, the control circuit controls the first switching semiconductor device to be ON after a lapse of a turn-ON time from when a control voltage is applied to the second switching semiconductor device. When switching the control signals of the first and second switching semiconductor devices from ON-control to OFF-control, the control circuit controls the control signal of the second switching semiconductor device to be OFF after a lapse of a turn-OFF time from when a control voltage is applied to the first switching semiconductor device.

Advantageous Effects of Invention

According to the present invention, by almost simultaneous ignition and arc extinction of two semiconductor devices forming one arm of a power conversion apparatus (a three-level converter), it becomes possible to output the same voltage as that output from the three-level converter, and also possible to reduce heat generation that is caused by one semiconductor device and is extremely large as compared with that by the other semiconductor device, with the result that the output current can be increased.

DESCRIPTION OF EMBODIMENTS

The present invention will be hereinafter described in detail with reference to the drawings, in which the same or corresponding parts are designated by the same reference characters, and description thereof will not be repeated.

Embodiments

Configuration of Power Conversion Apparatus

Figure 1:
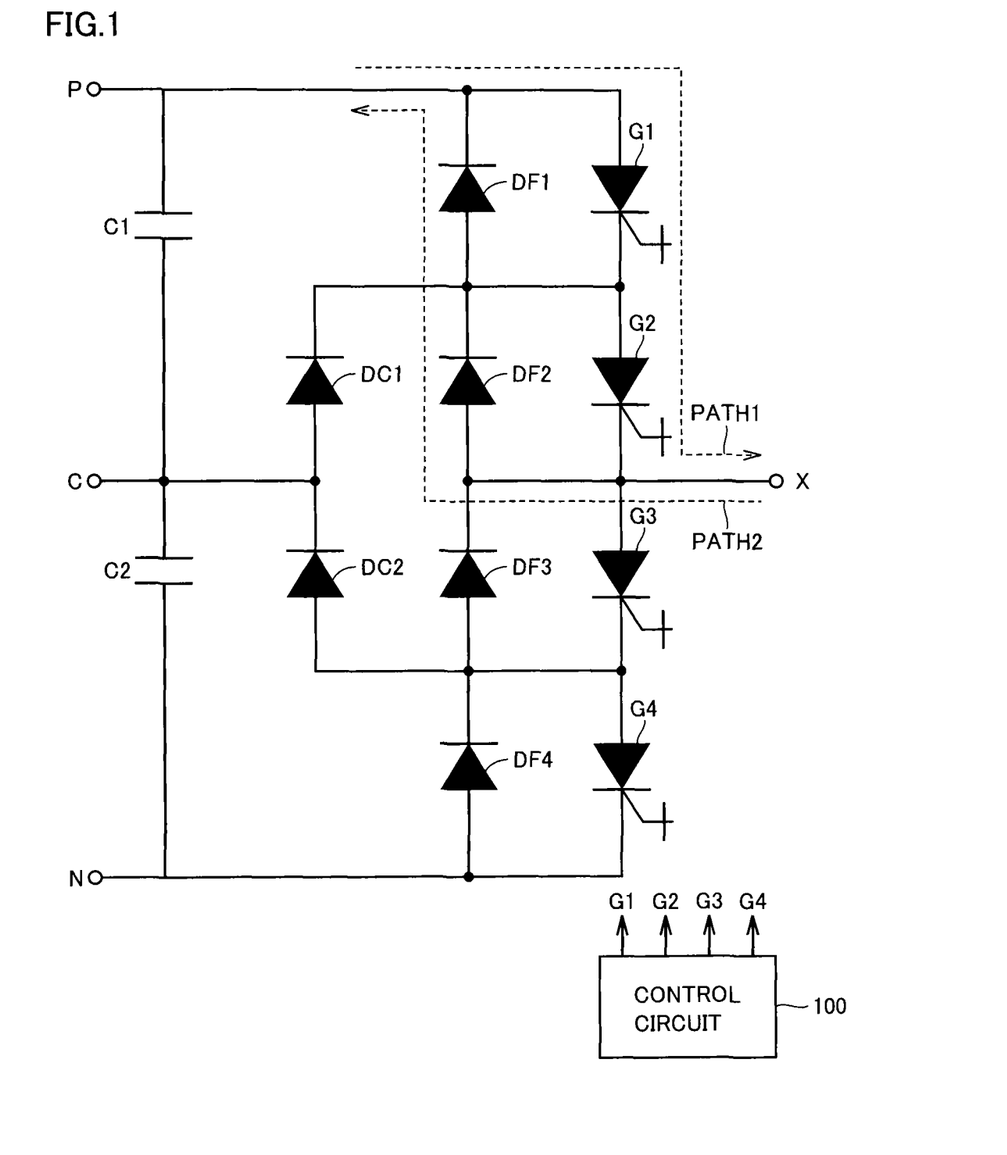
FIG. 1 is a diagram for illustrating the configuration and the operation of a power conversion apparatus according to an embodiment.

FIG. 1 is a diagram for illustrating the configuration and the operation of a power conversion apparatus according to an embodiment. Referring to FIG. 1, the power conversion apparatus is also referred to as a so-called three-level converter. The power conversion apparatus includes self-excited semiconductor devices G1 to G4, freewheeling diodes DF1 to DF4 connected antiparallel to self-excited semiconductor devices G1 to G4, coupling diodes DC1, DC2, and smoothing capacitors C1, C2 as DC voltage circuits. The self-excited semiconductor device may be a device that can switch ON and OFF by a gate signal, such as a GCT (Gate Commutated Turn-Off) thyristor, an IGBT (Insulated Gate Bipolar Transistor), an MOSFET (Metal-Oxide-Semiconductor Field-Effect Transistor), and the like.

Specifically, the power conversion apparatus includes: self-excited semiconductor devices G1, G2 connected in series in this order between a terminal P and a terminal X; freewheeling diodes DF1, DF2 connected in series in this order between terminal P and terminal X and in a direction opposite to a direction in which a current flows through self-excited semiconductor devices G1, G2; a coupling diode DC1 having an anode connected to terminal C and a cathode connected to a connection node between self-excited semiconductor device G1 and self-excited semiconductor device G2, and connected to a connection node between freewheeling diode DF1 and freewheeling diode DF2; self-excited semiconductor devices G3, G4 connected in series in this order between terminal X and terminal N; freewheeling diodes DF3, DF4 connected in series in this order between terminal X and terminal N and in a direction opposite to a direction in which a current flows through self-excited semiconductor devices G3, G4; and a coupling diode DC2 having a cathode connected to terminal C and an anode connected to a connection node between self-excited semiconductor device G3 and self-excited semiconductor device G4, and connected to a connection node between freewheeling diode DF3 and freewheeling diode DF4.

(Operation of Power Conversion Apparatus)

Terminals P, C and N may be supplied with various potentials. In the following description, however, for easy understanding, it is assumed that terminal C is supplied with an intermediate potential. In other words, terminal C is supplied with an intermediate potential that is lower than the highest potential and higher than the lowest potential.

Again referring to FIG. 1, the control in the power conversion apparatus (1) in the case where a voltage at terminal P is supplied to terminal X and (2) in the case where a voltage at terminal X is supplied to terminal P will be described.

First, in the case of (1), devices provided on path PATH1 illustrated by a dashed line are controlled to be ON and other devices are controlled to be OFF. Thereby, the voltage at terminal P can be supplied to terminal X. Specifically, self-excited semiconductor devices G1, G2 on path PATH1 are controlled to be ON and other devices are controlled to be OFF. Thereby, terminal X can receive the voltage at terminal P.

Next, in the case of (2), devices provided on path PATH2 illustrated by a dashed line are controlled to be ON and other devices are controlled to be OFF. Thereby, the voltage at terminal X can be supplied to terminal P. Specifically, freewheeling diodes DF1, DF2 on path PATH2 are controlled to be ON and other devices are controlled to be OFF. Thereby, terminal P can receive the voltage at terminal X.

Figure 2:
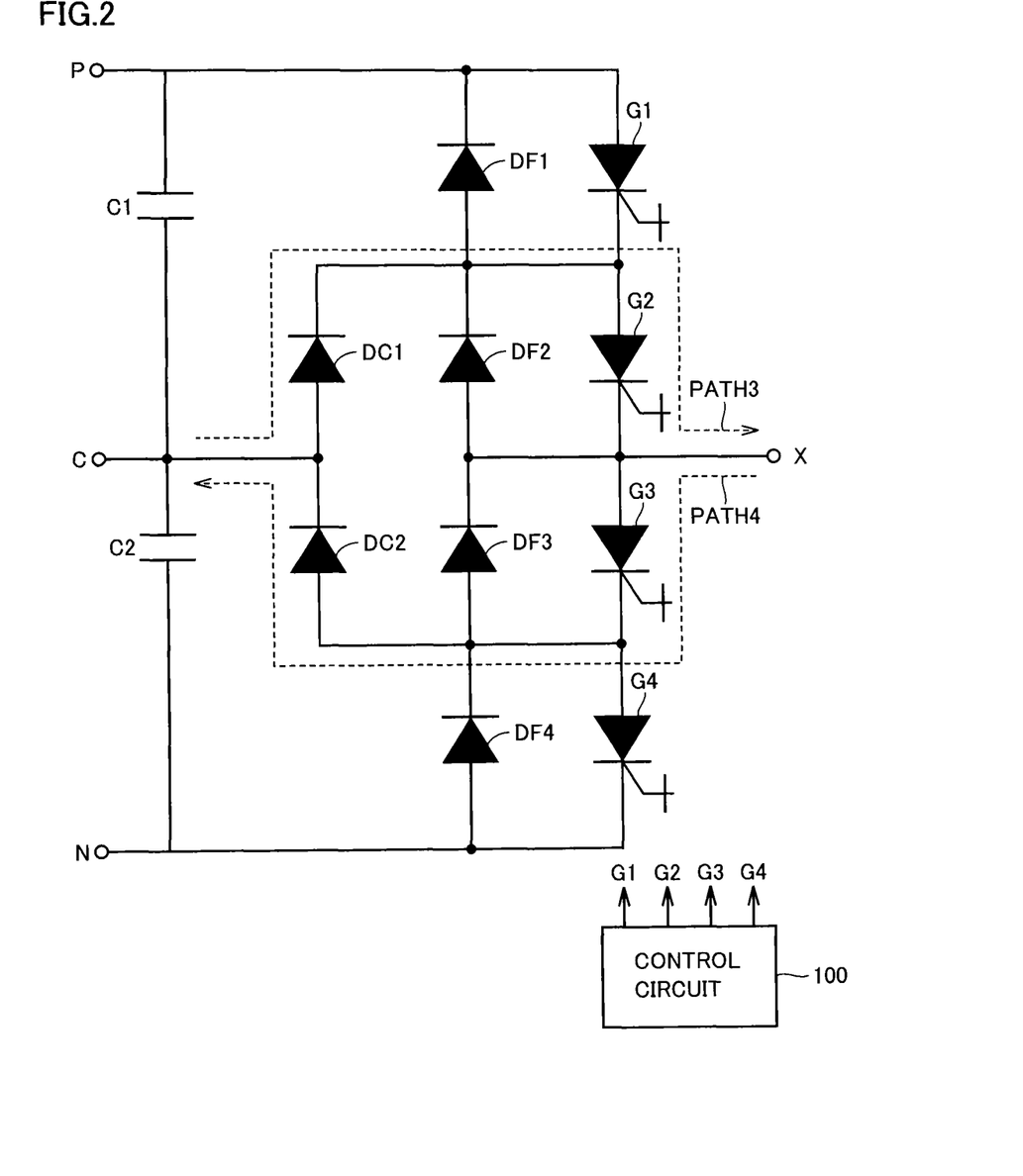
FIG. 2 is a diagram for illustrating the operation of the power conversion apparatus according to the embodiment.

FIG. 2 is a diagram for illustrating the operation of the power conversion apparatus according to the embodiment. Referring to FIG. 2, the control in the power conversion apparatus (3) in the case where a voltage at terminal C is supplied to terminal X and (4) in the case where a voltage at terminal X is supplied to terminal C will be described.

In the case of (3), devices provided on path PATH3 illustrated by a dashed line are controlled to be ON and other devices are controlled to be OFF. Thereby, the voltage at terminal C can be supplied to terminal X. Specifically, self-excited semiconductor device G2 and coupling diode DC1 on path PATH3 are controlled to be ON and other devices are controlled to be OFF. Thereby, terminal X can receive the voltage at terminal C.

In the case of (4), devices provided on path PATH4 illustrated by a dashed line are controlled to be ON and other devices are controlled to be OFF. Thereby, the voltage at terminal X can be supplied to terminal C. Specifically, self-excited semiconductor device G3 and coupling diode DC2 on path PATH4 are controlled to be ON and other devices are controlled to be OFF. Thereby, terminal C can receive the voltage at terminal X.

Figure 3:
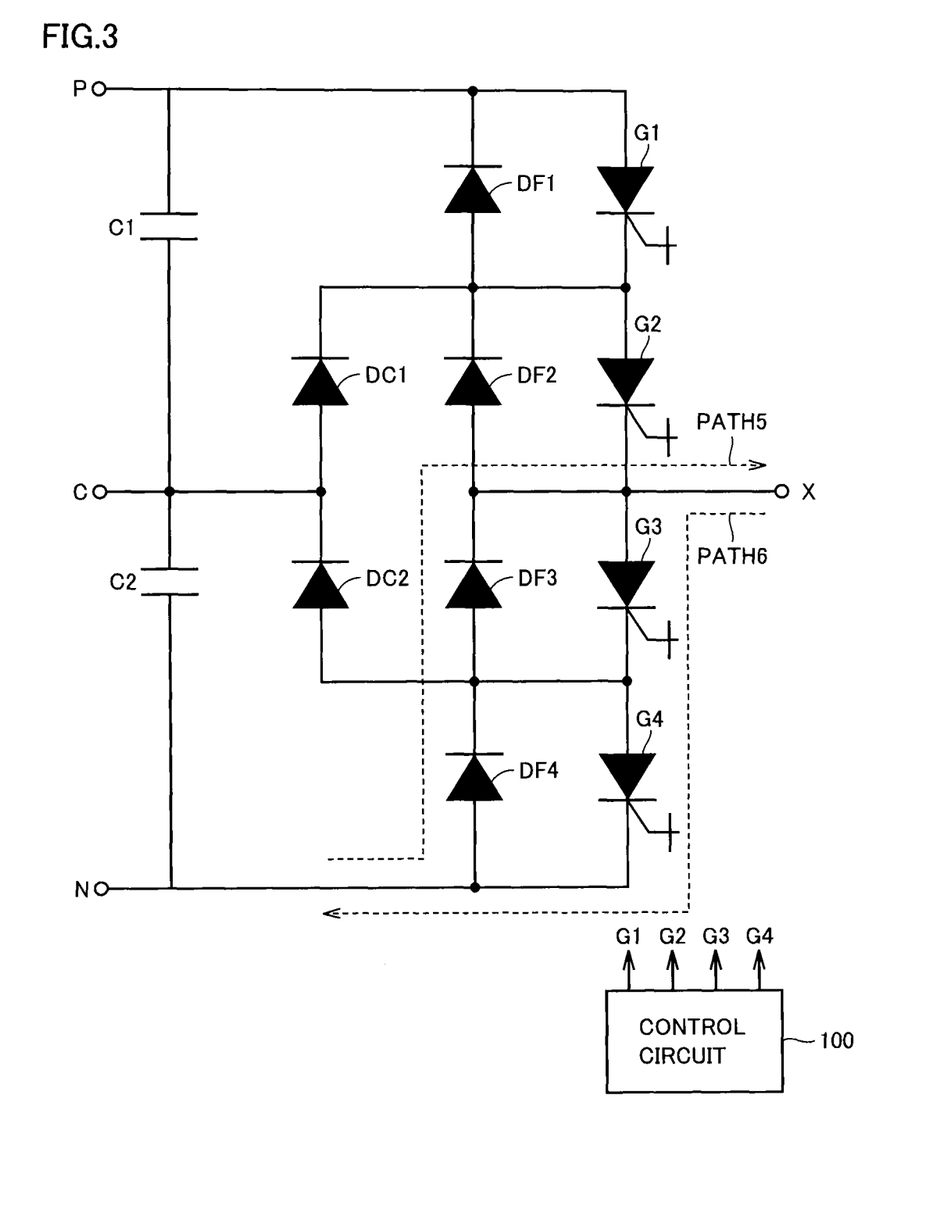
FIG. 3 is a diagram for illustrating the operation of the power conversion apparatus according to the embodiment.

FIG. 3 is a diagram for illustrating the operation of the power conversion apparatus according to the embodiment. Referring to FIG. 3, the control in the power conversion apparatus (5) in the case where a voltage at terminal N is supplied to terminal X and (6) in the case where a voltage at terminal X is supplied to terminal N will be described.

In the case of (5), devices provided on path PATH5 illustrated by a dashed line are controlled to be ON and other devices are controlled to be OFF. Thereby, the voltage at terminal N can be supplied to terminal X. Specifically, freewheeling diodes DF3, DF4 on path PATH5 are controlled to be ON and other devices are controlled to be OFF. Thereby, terminal X can receive the voltage at terminal N.

In the case of (6), devices provided on path PATH6 illustrated by a dashed line are controlled to be ON and other devices are controlled to be OFF. Thereby, the voltage at terminal X can be supplied to terminal N. Specifically, self-excited semiconductor devices G3, G4 on path PATH6 are controlled to be ON and other devices are controlled to be OFF. Thereby, terminal N can receive the voltage at terminal X.

(Control Signal)

Specific control signals from self-excited semiconductor devices G1 to G4 forming the power conversion apparatus of the present embodiment will be hereinafter described.

Figure 4:
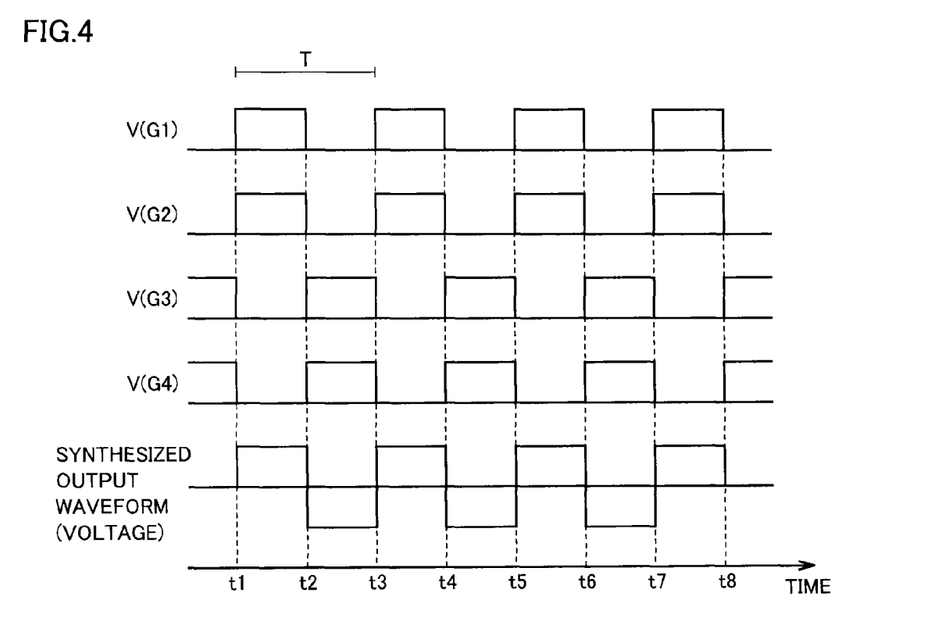
FIG. 4 is a diagram showing ignition patterns of self-excited semiconductor devices G1 to G4 in the case where a DC voltage 0V is output.

FIG. 4 is a diagram showing ignition patterns of self-excited semiconductor devices G1 to G4 in the case where a DC voltage 0V is output. Referring to FIG. 4, control signals of self-excited semiconductor devices G1 to G4 and a synthesized output waveform are shown.

In this case, self-excited semiconductor devices G1 and G2 are controlled to be ON almost simultaneously at time t1, but it is preferable that self-excited semiconductor device G2 is turned ON, and then, self-excited semiconductor device G1 is turned ON. In other words, self-excited semiconductor devices G1 and G2 are controlled such that self-excited semiconductor device G1 is turned ON after the rise time (turn-ON time) that is determined by the physical characteristics of self-excited semiconductor device G2.

Then, during time t1 to time t2, self-excited semiconductor devices G1 and G2 are controlled to be ON while self-excited semiconductor devices G3 and G4 are controlled to be OFF. At this time, the time periods during which self-excited semiconductor devices G1 and G2 are controlled to be ON are almost the same. Therefore, during this time period from time t1 to time t2, the voltage at terminal P is supplied to terminal X through paths PATH1 and PATH2.

Then, self-excited semiconductor devices G1 and G2 are controlled to be OFF almost simultaneously at time t2, but it is preferable that self-excited semiconductor device G1 is turned OFF, and then, self-excited semiconductor device G2 is turned OFF. In other words, self-excited semiconductor devices G1 and G2 are controlled such that self-excited semiconductor device G2 is turned OFF after the fall time (turn-OFF time) that is determined by the physical characteristics of self-excited semiconductor device G1.

Then, self-excited semiconductor devices G3 and G4 are controlled to be ON almost simultaneously at time t2, but it is preferable that self-excited semiconductor device G3 is turned ON, and then, self-excited semiconductor device G4 is turned ON. In other words, self-excited semiconductor devices G3 and G4 are controlled such that self-excited semiconductor device G4 is turned ON after the rise time (turn-ON time) that is determined by the physical characteristics of self-excited semiconductor device G3.

During time t2 to time t3, self-excited semiconductor devices G3 and G4 are controlled to be ON while self-excited semiconductor devices G1 and G2 are controlled to be OFF. At this time, the time periods during which self-excited semiconductor devices G3 and G4 are controlled to be ON are almost the same. Therefore, during this time period from time t2 to time t3, the voltage at terminal X is supplied to terminal N through paths PATH5 and PATH6.

Then, self-excited semiconductor devices G3 and G4 are controlled to be OFF almost simultaneously at time t3, but it is preferable that self-excited semiconductor device G4 is turned OFF, and then, self-excited semiconductor device G3 is turned OFF. In other words, self-excited semiconductor devices G3 and G4 are controlled such that self-excited semiconductor device G3 is turned OFF after the fall time (turn-OFF time) that is determined by the physical characteristics of self-excited semiconductor device G4.

As described above, the time periods during which self-excited semiconductor devices G1 to G4 are controlled to be ON are almost the same and have a period T (during time t1 to time t3). Also, the control signal of self-excited semiconductor device G3 and the control signal of self-excited semiconductor device G2 are in an exclusive relation.

By controlling self-excited semiconductor devices G1 to G4 described above, a synthesized output waveform of period T can be obtained. In the case of this synthesized output waveform, only the voltages at terminals P and N are output. In other words, in the power conversion apparatus according to the present embodiment, the voltage at terminal C is not output, and the almost same operation as that of the so-called two-level converter is performed. However, although the harmonic content of the output voltage is increased as compared with the case of the conventional two-level converter, the problem of voltage sharing is solved.

Then described will be the state of the current flowing through each of the devices of the power conversion apparatus in the ignition patterns set forth with reference to FIG. 4.

Figure 5:
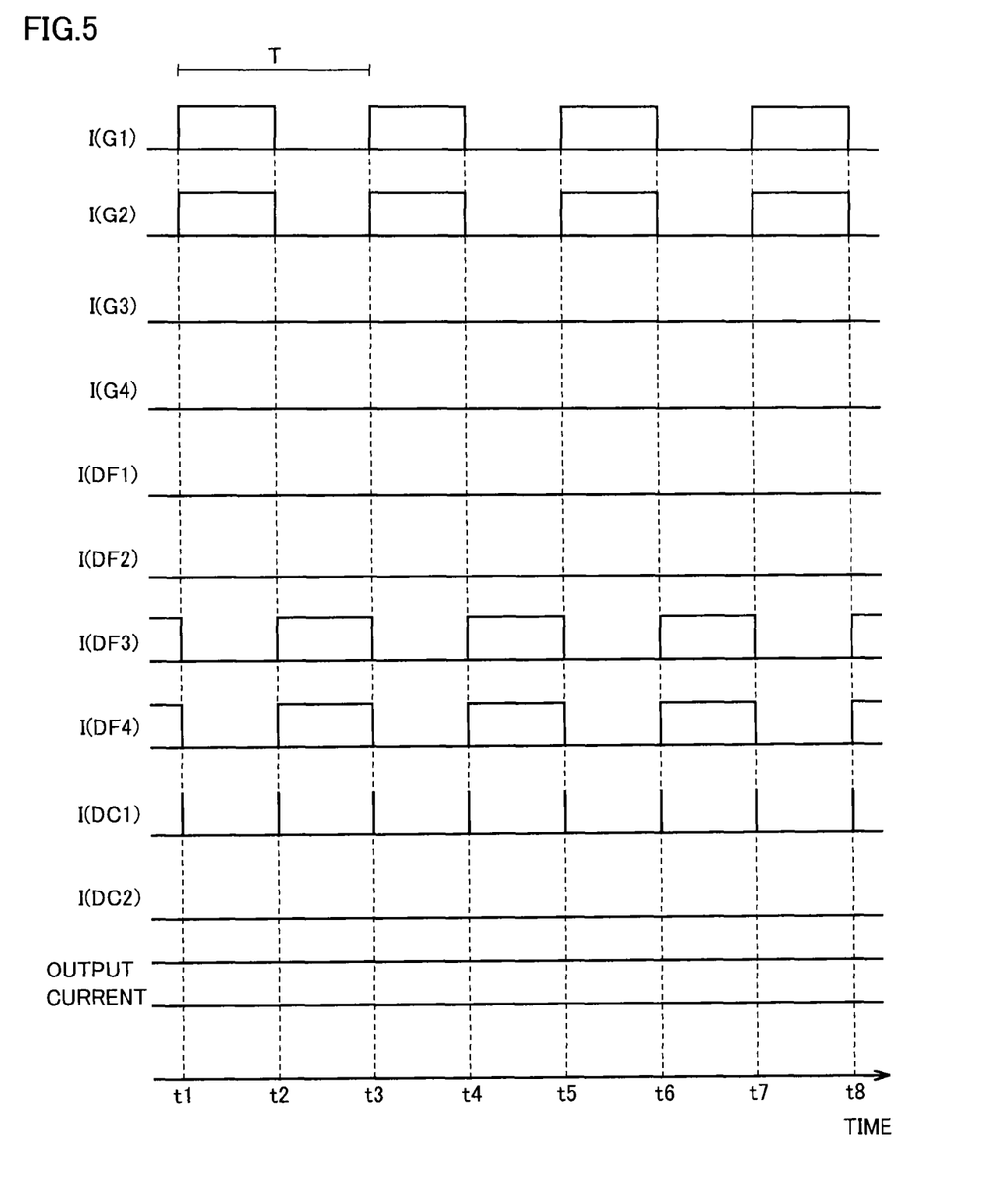
FIG. 5 is a diagram for illustrating a current flowing through each of the devices in the ignition patterns shown in FIG. 4.

FIG. 5 is a diagram for illustrating a current flowing through each of the devices in the ignition patterns shown in FIG. 4. Referring to FIG. 5, control signals of self-excited semiconductor devices G1 to G4; currents flowing through freewheeling diodes DF1 to DF4; currents flowing through coupling diodes DC1 and DC2; and an output current at terminal X are shown in this order from the top. In this case, FIG. 5 shows each current value on the condition that the direction of the current flowing from terminals P, C and N to terminal X is defined as positive.

Referring to FIGS. 4 and 5, during time t1 to time t2, self-excited semiconductor devices G1 and G2 are turned ON while self-excited semiconductor devices G3 and G4 are turned OFF. Accordingly, a current flows through each of paths PATH1 and PATH2. Therefore, in self-excited semiconductor devices G1 and G2, a current flows through path PATH1 to terminal X.

On the other hand, during time t2 to time t3, self-excited semiconductor devices G1 and G2 are turned OFF while self-excited semiconductor devices G3 and G4 are turned ON. Accordingly, a current flows through each of paths PATH5 and PATH6. Therefore, in freewheeling diodes DF3 and DF4, a current flows through path PATH5 to terminal X.

In this case, at time t2 and time t3, self-excited semiconductor devices G2 and G3 are instantaneously turned ON while self-excited semiconductor devices G1 and G4 are instantaneously turned OFF. Accordingly, a current flows through each of paths PATH3 and PATH4. Therefore, an instantaneous current flows through coupling diode DC1. The operation as described above is repeatedly performed in period T (during time t1 to time t3).

Then, the power conversion apparatus of the present embodiment will be described for the purpose of gaining a better understanding thereof by comparison with a reference example. It is to be noted that the reference example is identical in configuration to the embodiment of the present application, but is different in the manner as to how an input waveform is supplied to each of self-excited semiconductor devices G1 to G4.

Reference Example

Figure 6:
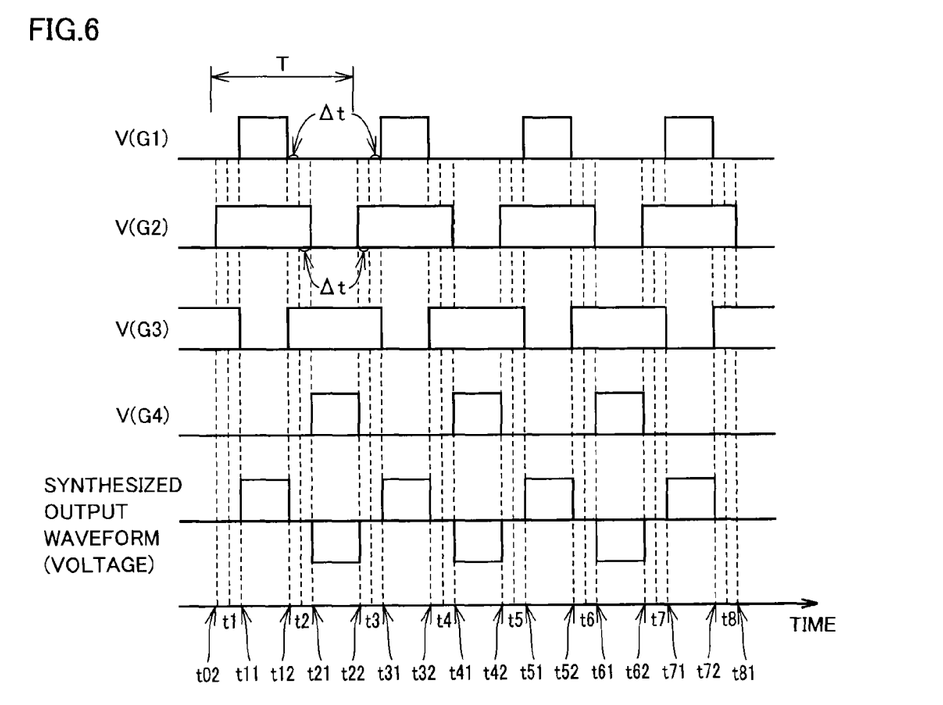
FIG. 6 is a diagram showing ignition patterns in reference examples of self-excited semiconductor devices G1 to G4 in the case where DC voltage 0V is output.

FIG. 6 is a diagram showing ignition patterns in reference examples of self-excited semiconductor devices G1 to G4 in the case where DC voltage 0V is output. These are ignition patterns used in the conventional three-level converter. The control signal in FIG. 6 will be described as compared with the control signal in FIG. 4. It is to be noted that the configuration of the power conversion apparatus to which this control signal is input is the same as that of the power conversion apparatus in the embodiment shown in FIG. 1.

Referring to FIG. 6, the applied voltage for an ON/OFF control signal for each of self-excited semiconductor devices G1 and G3 is used in an exclusive manner, and the applied voltage for an ON/OFF control signal for each of self-excited semiconductor devices G2 and G4 is also used in an exclusive manner.

Furthermore, the time period during which self-excited semiconductor device G1 is controlled to be ON is included in the time period during which self-excited semiconductor device G2 is controlled to be ON. Also, the time period during which self-excited semiconductor device G4 is controlled to be ON is included in the time period during which self-excited semiconductor device G3 is controlled to be ON. For example, (1) the time period from rise time t02 of self-excited semiconductor device G2 to rise time t11 of self-excited semiconductor device G1; (2) the time period from falling time t12 of self-excited semiconductor device G1 to falling time t21 of self-excited semiconductor device G2; (3) the time period from rise time t12 of self-excited semiconductor device G3 to rise time t21 of self-excited semiconductor device G4; and (4) the time period from falling time t22 of self-excited semiconductor device G4 to falling time t31 of self-excited semiconductor device G2 are set such that the harmonic content of the synthesized output waveform is minimized.

Specifically, self-excited semiconductor device G2 is controlled to be ON at time t02. Furthermore, self-excited semiconductor device G1 is controlled to be ON at time t11 after a delay of time 2×Δt.

Then, self-excited semiconductor devices G1 and G2 each are controlled to be ON till time t12. Then, at time t12, self-excited semiconductor device G1 is controlled to be OFF. Simultaneously, self-excited semiconductor device G3 is controlled to be ON.

Therefore, self-excited semiconductor devices G2 and G3 are controlled to be ON during time t12 to time t21. At time t21, self-excited semiconductor device G4 is controlled to be ON at the same time as when self-excited semiconductor device G2 is controlled to be OFF.

Then, at time t12, self-excited semiconductor device G3 is controlled to be ON, and then, at time t21, self-excited semiconductor device G4 is controlled to be ON. Self-excited semiconductor devices G3 and G4 each are controlled to be ON during time t21 to time t22.

Furthermore, at time t22, self-excited semiconductor device G2 is controlled to be ON at the same time as when self-excited semiconductor device G4 is controlled to be OFF.

Assuming that the time period from time t02 to time t22 described above is defined as one period T, a control circuit 100 provides an ignition pattern as described above to each of self-excited semiconductor devices G1 to G4 for each period T.

The synthesized output waveform as shown in FIG. 6 is obtained by inputting such a control signal. It is to be noted that the harmonic content of this synthesized output waveform is minimized.

Specifically, from time t11 to time t12, self-excited semiconductor devices G1 and G2 are controlled to be ON. Accordingly, terminal X receives a voltage at terminal P through paths PATH1 and PATH2.

Then, from time t12 to time t21, self-excited semiconductor devices G2 and G3 are controlled to be ON. Accordingly, terminal X receives a voltage at terminal C through paths PATH3 and PATH4.

Furthermore, from time t21 to time t22, self-excited semiconductor devices G3 and G4 are controlled to be ON. Accordingly, terminal X receives a voltage at terminal C through paths PATH5 and PATH6.

Since the state from time t22 to time t31 is similar to the state from time t12 to time t21, terminal X receives a voltage at terminal C.

Then, the state of a current flowing through each of the devices of the power conversion apparatus in ignition patterns set forth with reference to FIG. 6 will be hereinafter described.

Figure 7:
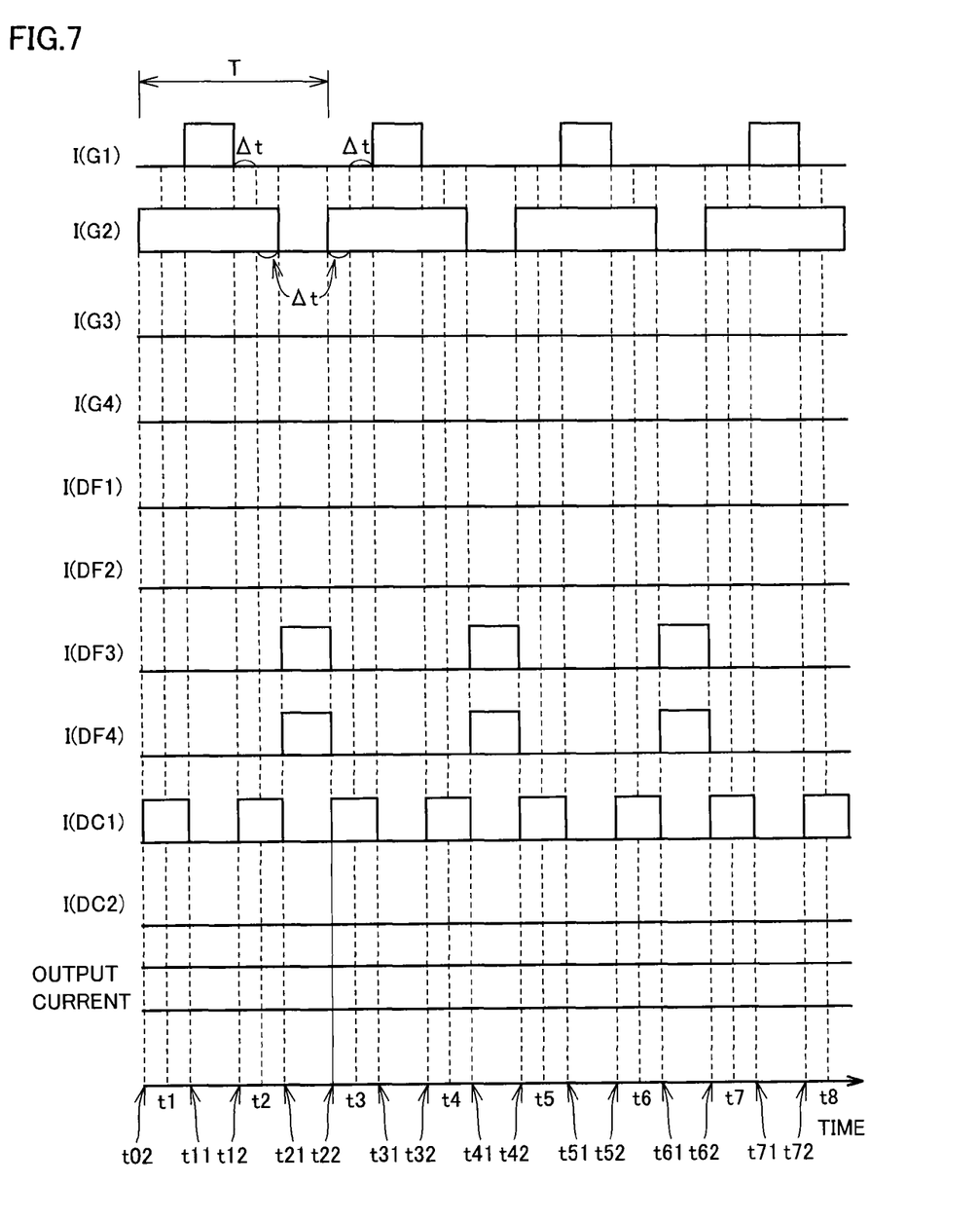
FIG. 7 is a diagram for illustrating the current flowing through each of the devices in the ignition patterns shown in FIG. 6.

FIG. 7 is a diagram for illustrating the current flowing through each of the devices in the ignition patterns shown in FIG. 6. FIG. 7 will be described as compared with FIG. 5. Referring to FIGS. 6 and 7, from time t02 to time t11, self-excited semiconductor devices G2 and G3 are turned ON while self-excited semiconductor devices G1 and G4 are turned OFF, so that a current flows through path PATH3. Therefore, in self-excited semiconductor device G2, a current flows through path PATH3 to terminal X. At this time, a current flows also through coupling diode DC1 on path PATH3.

On the other hand, during time t11 to time t12, self-excited semiconductor devices 01 and G2 are turned ON while self-excited semiconductor devices G3 and G4 are turned OFF, so that a current flows through path PATH1. Therefore, in self-excited semiconductor devices G1 and G2, a current flows through path PATH1 to terminal X.

Then, during time t12 to time t21, self-excited semiconductor devices G2 and G3 are turned ON while self-excited semiconductor devices G1 and G4 are turned OFF again, so that a current flows through path PATH3. Therefore, a current flows through coupling diode DC1 again.

Then, during time t21 to time t22, self-excited semiconductor devices G3 and G4 are turned ON while self-excited semiconductor devices G1 and G2 are turned OFF, so that a current flows through path PATH5.

The operation as described above is repeatedly performed in period T (during time t02 to time t22).

Then, referring to FIGS. 5 and 7, self-excited semiconductor device G2 and coupling diode DC1 are applied with a current for a longer duration and by a larger number of times than those in the case of other devices such as self-excited semiconductor devices G3, G4, coupling diode DC2, as shown in FIG. 7. Accordingly, since the life of self-excited semiconductor device G2 or coupling diode DC1 becomes shorter than the lives of other devices, a variable-speed pumping generator equipped, for example, with the conventional power conversion apparatus is to be often repaired or replaced, which is therefore inefficient.

On the other hand, in the power conversion apparatus according to the present embodiment, self-excited semiconductor devices G1 and G2 are almost simultaneously controlled to be ON/OFF, and self-excited semiconductor devices G3 and G4 are almost simultaneously controlled to be ON/OFF in an exclusive relation with the ON/OFF control for self-excited semiconductor devices G1 and G2. Accordingly, the loads on the devices (for example, self-excited semiconductor devices G1, G2 and freewheeling diodes DF3, DF4) through which a current flows are almost the same as shown in FIG. 5. Furthermore, power consumption can also be reduced.

Therefore, in contrast to the conventional reference example, these devices are more likely to end their lives at approximately the same time, and thus, the variable-speed pumping generator equipped with the power conversion apparatus of the present embodiment can be repaired or replaced in an efficient manner.

Lastly, the embodiment will be summarized with reference to the drawings and the like.

As shown in FIGS. 1 to 3, the embodiment includes a three-level converter converting an AC voltage of an AC power supply into a DC voltage having three levels corresponding to first to third potentials. The three-level converter includes: terminals P, C, N; and a terminal X outputting the DC voltage. The terminal C is supplied with an intermediate potential of the first to third potentials. The three-level converter further includes: self-excited semiconductor devices G1, G2 connected in series in this order between terminal P and terminal X; freewheeling diodes DF1, DF2 connected in series in this order between terminal P and terminal X and in a direction opposite to a direction in which a current flows through self-excited semiconductor devices G1, G2; a coupling diode DC1 having an anode connected to terminal C and a cathode connected to a connection node between self-excited semiconductor device G1 and self-excited semiconductor device G2, and connected to a connection node between freewheeling diode DF1 and freewheeling diode DF2; self-excited semiconductor devices G3, G4 connected in series in this order between terminal X and terminal N; freewheeling diodes DF3, DF4 connected in series in this order between terminal X and terminal N and in a direction opposite to a direction in which a current flows through self-excited semiconductor devices G3, G4; and a coupling diode DC2 having a cathode connected to terminal C and an anode connected to a connection node between self-excited semiconductor device G3 and self-excited semiconductor device G4, and connected to a connection node between freewheeling diode DF3 and freewheeling diode DF4. The embodiment further includes control circuit 100 controlling self-excited semiconductor devices G1 to G4 to be switched ON and OFF. When switching control signals of self-excited semiconductor devices G1, G2 from OFF-control to ON-control, control circuit 100 controls self-excited semiconductor device G1 to be ON after a lapse of a turn-ON time from when a control voltage is applied to self-excited semiconductor device G2. When switching the control signals of self-excited semiconductor devices G1, G2 from ON-control to OFF-control, control circuit 100 controls the control signal of self-excited semiconductor device G2 to be OFF after a lapse of a turn-OFF time from when a control voltage is applied to self-excited semiconductor device G1.

Preferably, the second potential is the intermediate potential lower than the first potential and higher than the third potential. When switching control signals of self-excited semiconductor devices G3, G4 from OFF-control to ON-control, control circuit 100 controls self-excited semiconductor device G4 to be ON after a lapse of a turn-ON time from when a control voltage is applied to self-excited semiconductor device G3. When switching the control signals of self-excited semiconductor devices G3, G4 from ON-control to OFF-control, control circuit 100 controls the control signal of self-excited semiconductor device G3 to be OFF after a lapse of a turn-OFF time from when a control voltage is applied to self-excited semiconductor device G4.

Further preferably, the control signal of self-excited semiconductor device G3 and the control signal of self-excited semiconductor device G2 are in an exclusive relation.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

100 control circuit, C, N, P, X terminal, C1, C2 smoothing capacitor, DC1, DC2 coupling diode, DF1 to DF4 freewheeling diode, G1 to G4 self-excited semiconductor device.

The invention claimed is:

1. A power conversion apparatus comprising:
a three-level converter converting an AC voltage of an AC power supply into a DC voltage having three levels corresponding to first to third potentials, said three-level converter including
first to third input terminals,
an output terminal outputting said DC voltage,
said second input terminal being supplied with an intermediate potential of said first to third potentials,
first and second switching semiconductor devices connected in series between said first input terminal and said output terminal, the first switching semiconductor device connected between the first input terminal and the second switching semiconductor device and the second switching semiconductor device connected between the first switching semiconductor device and the output terminal,
first and second freewheeling diodes connected in series between said first input terminal and said output terminal and in a direction opposite to a direction in which a current flows through said first and second switching semiconductor devices, the first freewheeling diode connected between the first input terminal and the second freewheeling diode and the second freewheeling diode connected between the first freewheeling diode and the output terminal,
a first coupling diode having an anode connected to said second input terminal and a cathode connected to a connection node between said first switching semiconductor device and said second switching semiconductor device, and connected to a connection node between said first freewheeling diode and said second freewheeling diode,
third and fourth switching semiconductor devices connected in series between said output terminal and said third input terminal, the third switching semiconductor device connected between the output terminal and the fourth switching semiconductor device and the fourth switching semiconductor device connected between the third switching semiconductor device and the third input terminal,
third and fourth freewheeling diodes connected in series between said output terminal and said third input terminal and in a direction opposite to a direction in which a current flows through said third and fourth switching semiconductor devices, the third freewheeling diode connected between the output terminal and the fourth freewheeling diode and the fourth freewheeling diode connected between the third freewheeling diode and the third input terminal, and
a second coupling diode having a cathode connected to said second input terminal and an anode connected to a connection node between said third switching semiconductor device and said fourth switching semiconductor device, and connected to a connection node between said third freewheeling diode and said fourth freewheeling diode; and a control circuit controlling said first to fourth switching semiconductor devices to be switched ON and OFF, wherein when switching control signals of said first and second switching semiconductor devices from OFF-control to ON-control, said control circuit controls said first switching semiconductor device to be ON after a lapse of a turn-ON time from when a control voltage is applied to said second switching semiconductor device, and when switching the control signals of said first and second switching semiconductor devices from ON-control to OFF-control, said control circuit controls the control signal of said second switching semiconductor device to be OFF after a lapse of a turn-OFF time from when a control voltage is applied to said first switching semiconductor device.

2. The power conversion apparatus according to claim 1, wherein said second potential is said intermediate potential lower than said first potential and higher than said third potential, when switching control signals of said third and fourth switching semiconductor devices from OFF-control to ON-control, said control circuit controls said fourth switching semiconductor device to be ON after a lapse of a turn-ON time from when a control voltage is applied to said third switching semiconductor device, and when switching the control signals of said third and fourth switching semiconductor devices from ON-control to OFF-control, said control circuit controls the control signal of said third switching semiconductor device to be OFF after a lapse of a turn-OFF time from when a control voltage is applied to said fourth switching semiconductor device.

3. The power conversion apparatus according to claim 2, wherein the control signal of said third switching semiconductor device and the control signal of said second switching semiconductor device are in an exclusive relation.

* * * * *